July 9, 1946.                E. BRAMSON                2,403,705
                          EGG CANDLING APPARATUS
                    Filed Dec. 16, 1942        4 Sheets-Sheet 1

INVENTOR.
Ely Bramson,
BY Osgood H. Dowell
Atty.

July 9, 1946.  E. BRAMSON  2,403,705
EGG CANDLING APPARATUS
Filed Dec. 16, 1942  4 Sheets-Sheet 3

INVENTOR.
Ely Bramson,
BY Osgood H. Dowell
Atty.

Patented July 9, 1946

2,403,705

UNITED STATES PATENT OFFICE 2,403,705

EGG CANDLING APPARATUS

Ely Bramson, Chicago, Ill., assignor to The Bramson Manufacturing Co., Chicago, Ill., a corporation of Illinois Application December 16, 1942, Serial No. 469,207

24 Claims. (Cl. 88—14.6)

This invention relates to the art of candling eggs and particularly to apparatus for use in candling eggs.

Candling consists in examining eggs while held between the observer and a source of light or while illuminated by light passing through the eggs, the operation being best conducted in a darkened room with the use of apparatus for holding the eggs so that light from the illuminating source passes through the eggs but not around them. A number of apparatus for this purpose have been known.

Eggs are tested by candling for determination of their condition and characteristics in accordance with which the eggs may be graded and selected or rejected for particular purposes. Good eggs are relatively translucent, while bad ones are comparatively opaque. Eggs incipiently or partially affected by decomposition, as in instances of small black rots, blood rots and blood rings, will in illuminated condition reveal the affected portions as darkened patches or circles. Air cells in merchantable eggs not strictly fresh will appear in the illuminated eggs as light rings. Imperfections in egg shells such as pin holes, fine cracks or fissures and weak formations which would allow air to enter the eggs and cause deterioration, are readily discernible in the illuminated eggs.

For accurate testing it is often not enough to observe the eggs in illuminated condition from one end only. It is desirable for most efficient candling to examine the eggs in illuminated condition from different aspects and especially from opposite ends or while held during a second examination in inverted or reverse position relative to that in which they were held for the first examination.

By imparting motion to the eggs immediately before examining them in illuminated condition, a candler or inspector is enabled to determine whether the eggs possess the highly desirable characteristic of mobility of the yolks within the whites, which is indicative of excellence if the eggs are otherwise perfect, whereas lack of such mobility due to clinging of the yolks to the shells indicates a defect.

Candling is extensively practiced in connection with the selecting and grading of eggs for merchandizing and the selecting of eggs for special purposes as in egg-processing plants and cold storage plants. Also in hatcheries eggs after partial incubation are tested by candling for presence or absence of live embryos, so that those which after partial incubation are found to be unfertile may be thrown out and replaced by fertile eggs.

In view of the extensive candling necessary in many plants, an object of the present invention is to provide improved apparatus such that by easily and rapidly performable operations eggs can be expeditiously candled in quantity lots, more specifically in filler lots comprising layers of eggs taken as units from egg crates or commercial shipping cases; and, in view of the importance of accurate testing, an object of the invention is to provide apparatus of such character and facilities as to promote both expeditious and highly efficient candling, more specifically by handling the eggs in a manner to move them effectively just prior to their examination in illuminated condition and enabling them to be easily twice candled, first while standing on end one way and then while inverted or in reverse position relative to that in which they were first presented for candling.

Further objects are to provide apparatus of practicable and efficient construction and mode of operation and of relatively simple character; to provide apparatus to enable two persons standing at its opposite sides to candle simultaneously different lots of eggs and to cooperate in candling both lots; to provide apparatus praticable for receiving and handling in filler lots eggs supplied in crates in which the superposed layers of eggs are separated by either embossed or unembossed paper board flats; to provide a construction in which parts necessary to be cleansed from time to time are conveniently removable for cleansing; to provide structural features of advantage in the manufacture of the apparatus; and to provide in apparatus of the type herein disclosed, wherein two trays are utilized cooperatively and alternatively for holding the eggs for candling, means for automatically controlling the electric lamp or lamps employed for illuminating purposes so as to avoid illumination and consumption of current at undesired times but to give illumination whenever and while either of the trays is in position for candling.

The invention will be best understood by reference to an illustrative embodiment of the several features thereof, shown in the accompanying drawings wherein:

Fig. 4 showing the apparatus in position for candling; Fig. 5 showing the apparatus in readiness for a second positioning of the eggs for a second candling; and Fig. 6 showing the apparatus in position for such second candling.

In the drawings, I denotes a long cabinet-like stand or support, hereinafter referred to as the cabinet, containing illuminating equipment in its intermediate portion, over which is mounted the movable egg handling portion of the apparatus. This cabinet is constructed to provide at opposite ends of its intermediate portion a pair of low tables 2 and 3, one of which may serve as a receiving table for crates from which the eggs are to be removed in filler lots for candling, and the other of which may support other crates or receptacles in which selected candled eggs may be packed or deposited. Removably affixed table end extensions are indicated at 4. Open shelves 5 in the table portions of the cabinet may support pans or receptacles for spoiled or defective eggs rejected in candling.

The opposite side walls of the cabinet have intermediate raised portions 6 supporting a pair of longitudinally disposed rails 7. Riding on these rails is a longitudinally shiftable carriage 8 mounted for easy motion on ball bearings as indicated at 9 in Fig. 8. The carriage supports a pair of trays 10 and 11 either of which may receive the eggs to be candled and the two of which are utilized cooperatively and alternatively for holding the eggs for candling, as, for example, in the manner illustrated in Figs. 3 to 6. By oppositely shifting the carriage, the trays when resting directly thereon may be brought alternately to position for candling, i. e. with their light apertures in registration with subjacent illuminating means represented in this instance by a multiplicity of light condensing lenses 12 of the same number and arrangement as the light apertures in each of the trays, through which lenses light is transmitted from illuminating means below them.

The trays 10 and 11 are represented as shallow receptacles comprising rectangular frames having supporting ledges for bottom members which are readily removable for cleansing. An individual tray bottom member may comprise a plate 13 of Bakelite or other suitable material having adhesively affixed to its upper side a rubber mat 14, said plate and rubber mat having registering openings for passage of light and the rubber mat being formed around the openings with raised bosses 15 providing annular seats on which the eggs can stand on end. Being circular and of opaque cushioning material, the egg seats support the eggs so that light from below will pass up through the eggs but not around them.

Figure 8:
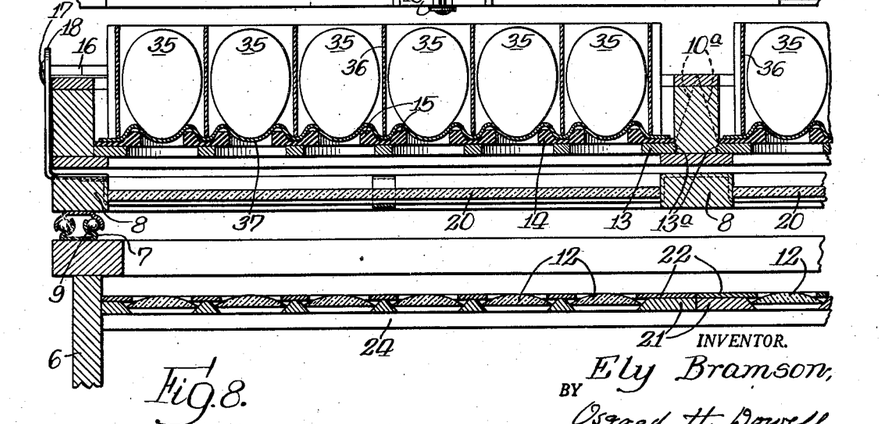
Fig. 8 is a cross section taken on the line 8—8 of Fig. 2, looking in the direction of the arrows.

To prevent dislocation of the removable tray bottoms when the trays 10 and 11 are inverted, the Bakelite plates 13 are fitted tightly in the tray frames and each of said plates has one edge rounded and fitted in a slight groove therefor in the tray frame, as indicated at 13$^a$ in Fig. 8; the construction being such that the removable tray bottom members have to be forced into place and have to be forcibly displaced to remove them for cleaning.

Figure 1:
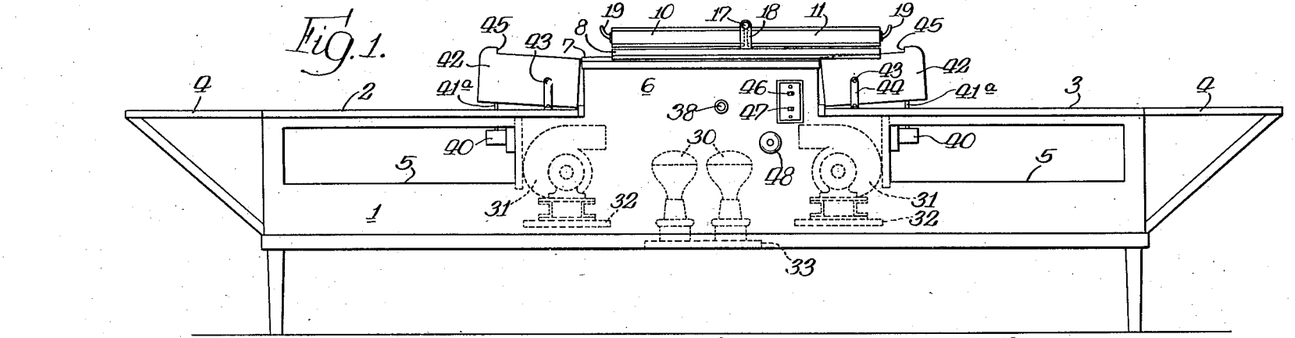
Fig. 1 is a side view of an egg candling apparatus of one practicable construction embodying the invention.

Normally supported in horizontal position as in Fig. 1, the trays 10 and 11 are swingably mounted for movement about an axis transverse of the direction of travel of the carriage, being so mounted that either tray can be swung to an inverted position upon the other and the two in folded relation can be swung together to an upside down position and back to a re-inverted position, as will be apparent from Figs. 3 to 6. As shown, the trays are swingably mounted for the motions aforesaid by suitably hinging them together by hinges 16, the pintles 17 of which are attached to and carried by small standards 18 fixed to the carriage 8. Handles by which the trays can be swung are indicated at 19. The number and arrangement of the light apertures and egg seats of the trays are the same in both trays, and when the trays are one over the other or in folded relation the egg seats of the one face those of the other, the confronting egg seats being then adjacent to opposite ends of the eggs encased by the trays.

Referring to the tray handles 19, attention is invited to an incidental feature of important advantage in that the handles of the two trays at either side of the longitudinal center can be gripped as one when the trays are in folded relation and utilized for swinging the folded trays together to inverted position without danger of hurting one's hand or fingers between the handles and tray frames. These handles, attached to the tray frames at their swinging ends, are of the type comprising straight hand grip portions arranged longitudinally of the swinging ends of the tray frames and separated therefrom by attaching arms integral with said hand grip portions. Now if the hand grip portions of the cooperating pair of handles at either side of the longitudinal center of the trays were substantially spaced apart when the trays are in folded relation, then a person inserting his hand or fingers between the handles and trays and grasping the handles of the two trays would be liable to have his hand or fingers caught and crushed or hurt and possibly broken in the operation of swinging the folded trays together to an inverted position. By forming the handles as shown so that when the two trays are folded together the hand grip portions of the cooperative handles come together and can be gripped as one handle, the difficulty referred to is avoided.

To enable two poresons standing at opposite sides of the apparatus to candle simultaneously different filler lots of eggs, and also to cooperate with each other in the candling of both lots, the trays 10 and 11 are each of a capacity to hold such different lots. As shown the trays are partioned each into two compartments at opposite sides of the longitudinal center of the apparatus. Each compartment is adapted to receive as a unit a filler lot or layer of eggs in assembly with its paper board filler and underlying paper board flat. Standard crates have the eggs packed in each compartment thereof in layers of three dozen eggs per layer. In this connection it will be observed that the number and arrangement of the egg seats in each compartment of each of the trays 10 and 11 correspond to the number and arrangement of eggs of a layer in a crate compartment, the egg seats of each tray compartment being disposed to hold the eggs in substantially the same spaced relationship as in the crate.

It will be readily apparent that the capacity of the illustrative apparatus could be doubled by forming each of the trays 10 and 11 with four instead of two compartments, arranged two at each side of the longitudinal center of the tray, and correspondingly doubling the number of illuminating lenses 12 and providing appropriate additional illuminating means below the added number of lenses. So also the capacity of the apparatus could be doubled without altering the illuminating equipment or increasing the number of lenses, by doubling the number of tray compartments as above indicated and providing for a correspondingly greater travel of the carriage 8 and making appropriate provision for positioning the respective pairs of tray compartments, i. e. the compartments spaced from others by the transverse partitions, and for obtaining illumination during any such positioning or while either of the two pairs of tray compartments of either tray is positioned for the candling of the eggs supported thereon.

Figure 3:
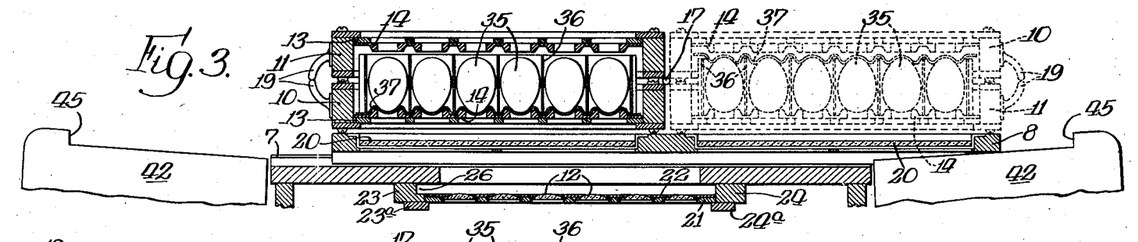
Figs. 3 to 6 are longitudinal vertical sectional views of a portion of the apparatus in different relative positions of the parts thereof, Fig. 3 showing the apparatus in readiness for positioning the eggs for candling.
Figure 4:
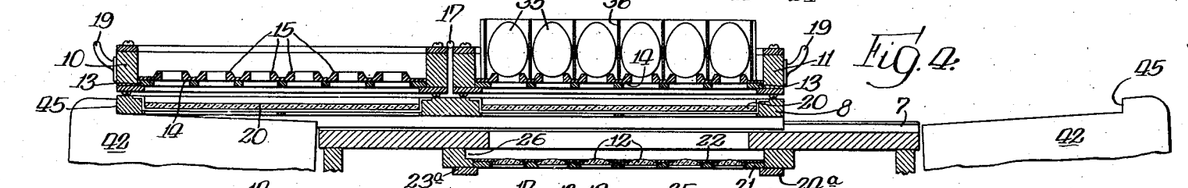
Figure 7:
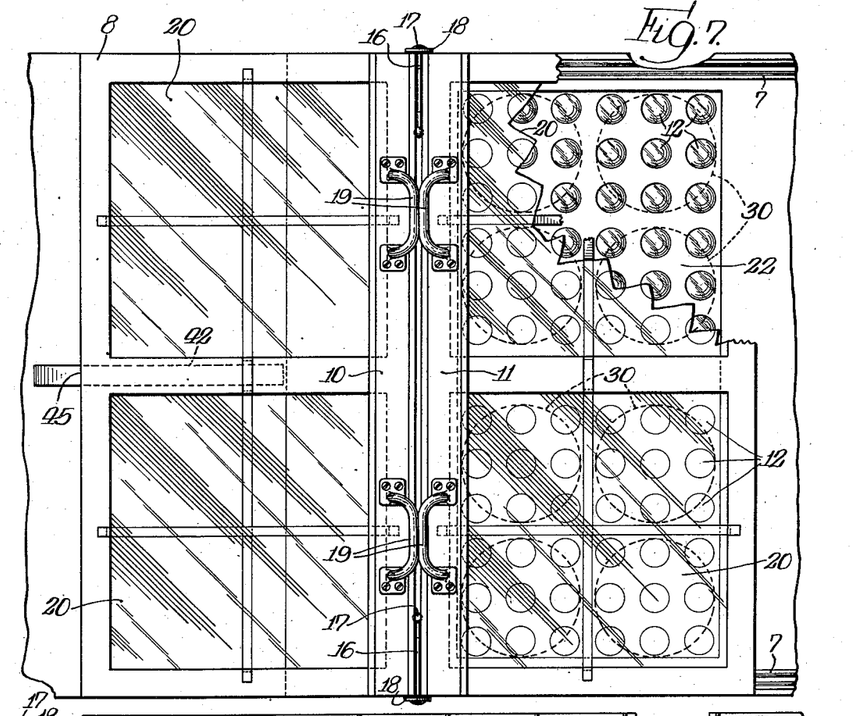
Fig. 7 is a top plan view of the apparatus with its egg candling trays shown folded together and vertically disposed, parts of the apparatus being broken away to reveal subjacent parts, and the table end portions of its cabinet being broken away.

The carriage 8 of the illustrative apparatus is represented as a horizontal frame resembling a window sash with subdivisions or compartments corresponding to those of the trays and in which are glass panes 29 removably supported to permit them to be taken out for cleansing (Figs. 3, 7 and 8). These glass panes will catch any drippings from cracked or broken eggs on the trays and prevent such drippings and dust or dirt from falling through the trays upon the subjacent lenses 12.

As shown in Figs. 7 and 8, the lenses 12 are mounted in a pair of holding members 21 arranged at opposite sides of the longitudinal center of the apparatus, each of said members carrying half of the whole number of lenses arranged in accordance with the egg seats of a tray compartment. An individual lens holding member comprises a plate of Bakelite or other suitable material having the lenses fitted in counterbored openings in said plate and retained by a thin plate 22 of similar material superimposed on and rigidly fixed to said first mentioned plate and having openings in registration with those in said first mentioned plate, the edges or peripheral portions of the lenses being secured by and between the two plates. These lens holding members 21, which are insertable in proper position in the apparatus and removable therefrom for cleansing, are not only of a construction advantageous for manufacture but also they provide very convenient means whereby groups of lenses corresponding to the groups of egg seats in the egg tray compartments can be easily positioned with the whole group of lenses in proper place.

Figures 9, 10, 12:
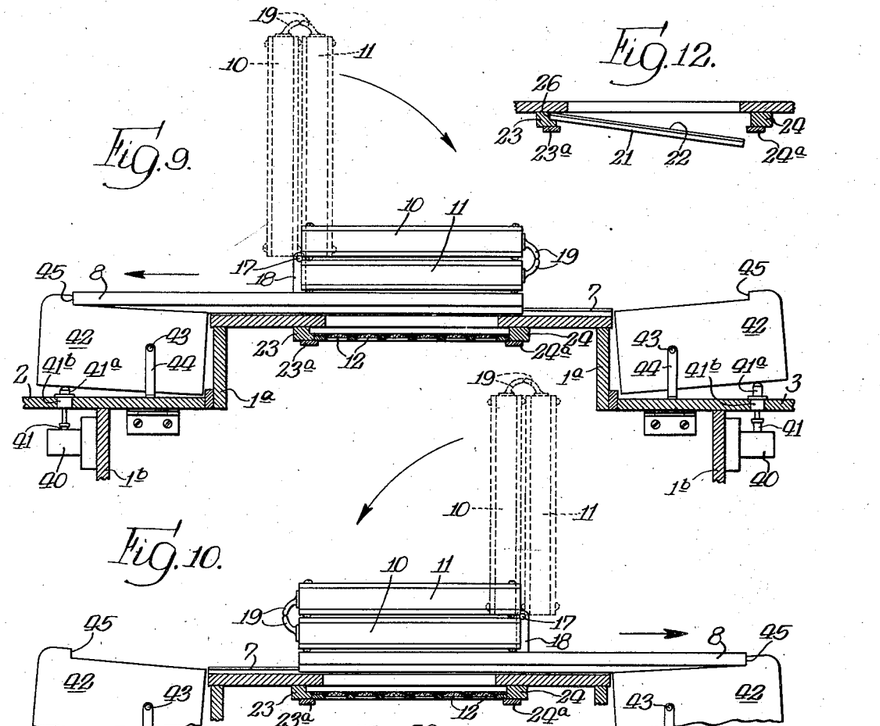
Figs. 9 and 10 are views showing in its opposite extreme positions the carriage for the egg candling trays, said carriage and trays folded one upon the other being shown in these figures in side elevation and the supporting portion of the structure being in longitudinal vertical section.
Fig. 12 is a detail sectional view showing the manner of removably mounting a lens holder embodied in the illustrative apparatus, said lens holder being shown in Figs. 9 and 10.

The manner of mounting the lens holding members 21 will be understood by reference to Figs. 3, 7, 8, 9, 10, and 12, wherein 23 and 24 designate wood cross bars connecting the sidewalls of the cabinet and rabbeted to form supporting ledges for said members or having affixed bottom strips 23ª and 24ª arranged to form such ledges. The two lens holding members 21, arranged at opposite sides of the longitudinal center of the apparatus and abutting edge to edge as shown in Figure 8, are fitted within the rectangular space formed between said cross bars 23, 24 and side walls of the cabinet, said members 21 resting on said supporting ledges which, as will be observed, are transverse of the direction of travel of the carriage 8. The left hand cross bar 23 in Fig. 3 is rabbeted to form a groove at 26. As will be apparent from Fig. 12, the members 21 can be inserted from the right by moving then longitudinally to the left while tilting them to clear the cross bar 24 and inserting their left hand ends or edges into the groove 26; after which said members 21 can be moved to horizontal position between the cross bars 23 and 24 and withdrawn from the groove 26 and then allowed to drop down between the cross bars 23 and 24 upon the supporting ledges therefor. By the reverse of this operation, said members 21 can be extracted and removed from the apparatus to permit cleansing or removal of dust from or polishing the upper surfaces of the lenses. Referring to Fig. 9, when the carriage is in the left hand position shown and the table top 3 together with the lever 42 mounted thereon is displaced as hereafter explained, an opening is left between frame members 1ª and 1ᵇ through which one can reach his arm for inserting the lens holding members 21 in place in the manner above explained. Under the same conditions one can put his hand under and press up the members 21, move them to the left to insert their left hand ends into the groove 26, then let them tilt so that their right hand ends will drop down and clear the supporting ledge of the cross bar 24, as shown in Fig. 12, and then withdraw them from the apparatus.

The lens holding members 21 together with the lenses 12 mounted in the light apertures thereof form the medial portion of the ceiling of a light chamber within which is suitable illuminating equipment represented by a plurality of electric lamps 30, preferably of the flood type, which lamps are indicated in dotted lines in Figs. 1 and 7. By means hereinafter described, the electric lamps may be controlled to give illumination only when the carriage is in a position for holding one or the other of the two trays 10 and 11 in position for candling or with its light apertures in registration with the lenses 12.

For carrying off heat generated by the lamps, air is forced through the light chamber by electrically operated blowers 31 arranged to take in room air from under the cabinet or laterally from open-bottomed air ducts in the cabinet and to blow the air over the lamps, the air discharging from the light chamber through the large openings formed between the cross members 32 supporting the blowers and the intermediate cross member 33 supporting the lamps. Means is provided as hereinafter described to insure operation of the blowers whenever the lamps are lit.

Figure 2:
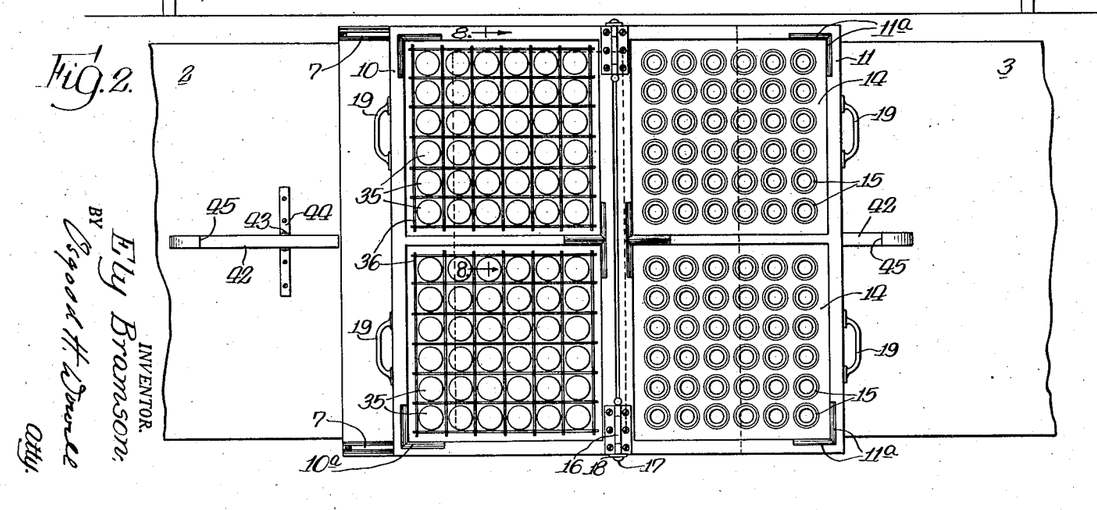
Fig. 2 is a top plan view of the illustrative apparatus with end portions thereof broken away, the omitted portons being table end portions of the cabinet of the apparatus.

As before indicated, the illustrative apparatus is designed to permit two persons standing at opposite sides thereof to candle simultaneously different filler lots of eggs, which lots are to be taken as units from crates and put into one or the other of the two trays 10 and 11, either of which may serve as the receiving tray. In this instance there are shown in Figs. 2 and 3, in the compartments of the tray 10, such filler lots of eggs 35, each such lot being in assembly with its paper board filler 36 and underlying paper board flat 37, all as in a layer in a crate compartment.

The paper board flats used in egg crates are commonly but not always of the embossed type shown at 37 in Fig. 3. An advantage of such embossed flats is that after lifting out a paper board filler from the crate the layer of eggs left standing on end on the cup-like seats of the underlying flat can be picked up as a unit and lifted out of the crate by means of a convenient device hereinafter referred to as an egg lot lifter. Such a device, of which there are several known forms or types used in egg handling plants, comprises a light rectangular frame having a basket type handle and egg engaging means within the frame. After a paperboard filler has been removed from a crate, the device can be let down in the crate with its frame enclosing the layer of eggs and, by manipulation of an actuating means, will engage and hold the eggs in their proper spaced relationship. The device with the layer of eggs retentively held by it can then be lifted out from the crate, and, by manipulation of its actuating means, will be caused to release the eggs. The device may therefore be used for lifting a layer of eggs from a crate and releasing them into the compartments of a filler in another crate or into pockets in egg candling apparatus or into a receptacle. In short it is a convenient transfer device for a layer or filler lot of eggs. But the device cannot be used for removing eggs from crates using unembossed flats, for the reason that upon removal of a filler from the layer of eggs resting on an unembossed flat the eggs will immediately tumble over on their sides and become disarranged. Hence an egg handling apparatus which would require or depend upon the use of an egg lot lifter for depositing the layers of eggs in the apparatus would not be practicable for use for candling eggs supplied, as they often are, in crates in which the layers are separated by unembossed flats; for in that case there would be no way of putting the eggs into the apparatus except one at a time by hand, which obviously would be quite impractical and defeat the purpose of expeditious handling of the eggs in filler lots. On the other hand it is often desirable to use an egg lot lifter for transferring layers of eggs from crates to candling apparatus, and a candling apparatus that would exclude the use of the egg lot lifter for that purpose would accordingly be somewhat limited in its utility. Now an advantage of the illustrative apparatus is that while it permits it does not require or depend upon the use of an egg lot lifter for depositing the layers of eggs in the apparatus, but is adapted to receive layers of eggs in assembly with their paper board fillers and flats, and hence is quite practicable for expeditious candling in filler lots of eggs supplied in crates in which the superposed layers of eggs are separated by either embossed or unembossed flats. In this connection, use may be made of any of the known expedients of the egg handling art for removing from crates layers of eggs with their associated fillers and flats, as unit assemblies, and for placing them as such in tray compartments of the illustrative candling apparatus.

The apparatus permits operations such as the following. Assume for example that the tray 10 is being used as a receiving tray, in the compartments of which have been placed filler lots of eggs 35, in this instance in assembly with their paper board fillers 36 and underlying paper board flats 37. The second tray 11 is now swung over and upon the tray 10, as in full lines in Fig. 3, whereupon the two trays are swung together to the upside down position indicated in dotted lines in said figure. The swinging of the trays in folded relation to the right from the position shown in full lines in Fig. 3 to the dotted line position shifts the freely movable carriage 8 to the left. The first tray 10 is then swung off from the second tray 11 and back to its normal horizontal position on the carriage, leaving the eggs, fillers and flats supported on the tray 11, the eggs standing on the seats therefor in said tray 11 and the paper board flats lying over the eggs. The flats are now removed. If the carriage 8 is not already in position for registering the light apertures of the egg holding tray 11 with the subjacent lenses 12, it is easily shifted by very slight effort to effect such registration, whereupon the apparatus is ready for candling, in the relative positions of the parts shown in Fig. 4. The eggs are now candled by examining them in illuminated condition within the compartments of the fillers. Such examination in the fillers is advantageous as it permits the eggs to be observed each illuminated by the light passing through it without interference by diffused light from adjacent eggs. A further advantage is that the illumination of the eggs while within the fillers shows off well their relative sizes, and thus candling in the fillers facilitates sorting as to sizes.

Figure 5:
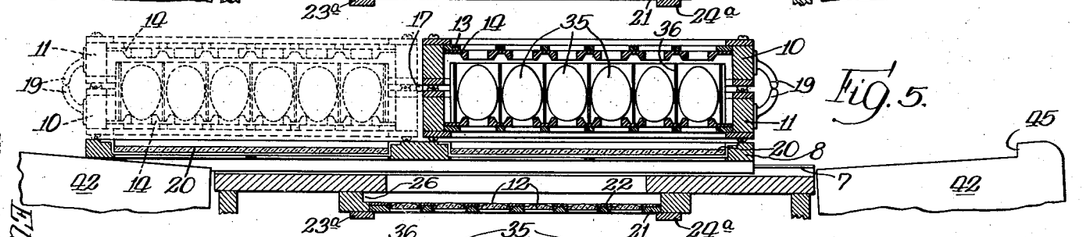
Figure 6:
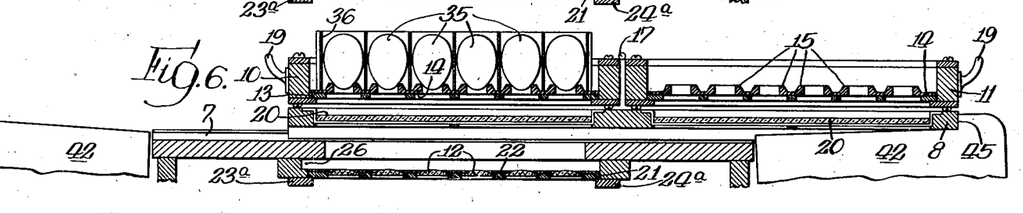

After this first candling, the tray 10 is swung over and upon the tray 11, as in full lines in Fig. 5, whereupon the two trays are swung together to the reinverted position indicated in dotted lines in said figure. The swinging of the two trays in folded relation to the left from the position shown in full lines in Fig. 5 to the dotted line position shifts the carriage to the right. The tray 11 is now swung off from the tray 10 to its normal horizontal position on the carriage, leaving the eggs and fillers supported on the tray 10. Assuming the carriage to have been shifted to position for registration of the light apertures of said tray 10 with the subjacent lenses 12, the apparatus is ready for a second candling of the eggs, with the parts in the relative positions shown in Fig. 6; the eggs now however being inverted relative to the position in which they were presented for the first candling, or standing on the opposite ends from those on which they stood during the first candling. Again the eggs are candled while in their filler compartments, after which the fillers may be lifted out from the compartments of the tray 10 and the eggs may then be given a final observation while outside of the fillers. In this final examination of the eggs out of the fillers the illuminated eggs may be observed by both operators standing at the opposite sides of the apparatus, so that in candling the eggs they may be viewed from both sides, the two operators cooperating, which greatly facilitates the expeditious and thorough candling of the eggs.

Eggs found by the candling to be defective or rejectable may be picked out from the filler lots in the apparatus and replaced by other satisfactory eggs. There may be kept on the table 2, in addition to the crate or crates from which the eggs are to be taken for candling, a receptacle containing previously tested satisfactory eggs, so that whenever it shall become necessary to remove an egg from the apparatus and replace it by another the substitution can be quickly made.

Upon completion of the second candling and removal of the paper board fillers from the tray 10, the filler lots of eggs left standing in proper spaced relationship on the egg seats of said tray can be lifted out as units by means of egg lot lifters such as have been described, and can be transferred by such lifters to filler compartments in another crate or into a receptacle or elsewhere as desired.

If desired to remove from the apparatus the filler lots of eggs in assembly with their fillers and flats arranged as when first introduced into the apparatus, this may be accomplished in the following manner. The fillers are replaced in association with the lots of eggs standing in the compartments of the tray 10. The tray 11 is then swung over and upon the tray 10, and the two trays are swung together to the position shown in full lines in Fig. 5, thus transferring the eggs and fillers to the tray 11. The tray 10 is then swung off from the tray 11, and the paper board flats are laid over the filler lots of eggs in the tray 11. The tray 10 is then replaced over the tray 11, as in full lines in Fig. 5, and the two trays are swung together to the reinverted position shown in full lines in Fig. 3, whereupon the tray 11 is swung off from the tray 10. This leaves on the tray 10 the filler lots of eggs in assembly with their paper board fillers and flats arranged exactly as when they were first put into said tray, the eggs being in their respective filler compartments and standing small ends down on the cup-like seats therefor formed by the embossments of the embossed paper board flats underlying the eggs.

To facilitate removal from the trays of the filler lots of eggs in assembly with their fillers and underlying flats, the tray frames may be formed preferably at diagonally opposite corners with cut-away portions as indicated at 10ª and 11ª in Fig. 2 and in dotted lines in Fig. 8, to provide room for insertion of the fingers under the corners of the flats. Obviously the tray frames could be variously formed with openings to permit insertion of the fingers under the flats and lifting them with the eggs and fillers thereon out from the tray compartments; or side or end walls of tray compartments could be omitted so as to permit insertion of flat scoops under the flats and the lifting out from the tray compartments of the units comprising the filler lots of eggs, their fillers and underlying flats. It is also contemplated that in apparatus embodying the invention the trays will be formed with their inner walls flaring to provide room for insertion of the fingers under the flats.

The apparatus may also be used with egg lot lifters for transferring the eggs from crates to the apparatus, if the layers of eggs in the crates are separated by embossed flats. When using the apparatus in this manner, fillers removed from crate compartments are first put into the compartments of one of the trays, say the tray 10. The layers of eggs left standing in the crate compartments on the embossed seats of the underlying flats are then lifted out by the egg lot lifters and released therefrom into the fillers on the tray 10; the eggs dropping upon the cushion seats therefor at the bottoms of the tray compartments. The carriage 8 being positioned for registering the light apertures of tray 10 with the subjacent lenses, the eggs are now candled while in their filler compartments. After this first candling, the tray 11 is swung over and upon the tray 10, and the two trays are swung together to upside down position, thus transferring the eggs and fillers to the tray 11, whereupon the tray 10 is swung off. The carriage being positioned for registration of the light apertures of tray 11 with the subjacent lenses, the eggs, now standing upside down or inverted relative to the position in which they were presented for the first candling, are again candled while in their filler compartments; after which the fillers may be lifted from the eggs to permit them to be finally observed in illuminated condition while out of the fillers. The filler lots of eggs may then be lifted out from the tray 11 by egg lot lifters and deposited or transferred as desired.

So the eggs to be candled may be transferred in filler lots from crates into the receiving tray of the apparatus with the use of egg lot lifters if the flats between the egg layers in the crates are embossed; or the said filler lots of eggs in assembly with their fillers and underlying flats may be removed as units from the crates and placed in the receiving tray. The apparatus is therefore practicable for expeditious candling in filler lots of eggs supplied in crates in which the superposed layers are separated by unembossed flats, consisting of plain flat paper board sheets, as well as for such expeditious candling of eggs supplied in crates using embossed flats.

There may be provided in each of the opposite side walls of the light chamber a conveniently located aperture 38 (Fig. 1) to which an egg can be held for illumination in case the operator should desire to test it individually; the light in said chamber illuminating the egg so held, assuming the apparatus to be used in a dark room.

As will be readily understood from the drawings, the trays 10 and 11 are alternately positioned for registration of their light apertures with the subjacent lenses 12 by shifting the carriage 8 alternately in opposite directions. This is accomplished in a highly advantageous manner in the illustrative apparatus in which the swinging of the trays in folded relation toward either end of the apparatus to invert them will cause the carriage freely movable on its ball bearings to shift to the limit of its travel in the opposite direction, thereby bringing to position for such registration the tray which is normally the more remote from the end limit of travel toward which the carriage shifted. Such tray will be referred to as the remote tray, namely, the one more remote from an end limit of travel when the two trays lie side by side on the carriage as in Fig. 1. Thus in Fig. 1 the tray 10 is the remote tray with respect to the right hand limit of travel of the carriage and the tray 11 is the remote tray with respect to the left hand limit of travel of the carriage.

The feature of the invention last referred to will be best understood by reference to Figs. 9 and 10. Consider, for example, that the apparatus as shown in Figs. 9 and 10 is being used for the series of operations hereinbefore described with reference to Figs. 3 to 6. Fig. 9 shows the apparatus with the parts in the relationship assumed when the trays 10 and 11 have been swung from the position shown in full lines in Fig. 3 to the upside down position indicated in dotted lines in Fig. 3. Referring now to Fig. 9, when the two trays were supported on the left hand half of the carriage with the tray 11 atop of the other, the carriage was in its extreme right hand position. As the trays were swung together toward the right from a position on the left hand half of the carriage to the vertically disposed mid position indicated in dotted lines in Fig. 9, the thrust of the trays on the carriage held it in its extreme right hand position, but as the trays were swung from said dotted line mid position to that shown in full lines in Fig. 9, the thrust of the trays against the carriage forced it to its extreme left hand position as shown in Fig. 9. Now if the two trays are swung together toward the left from the position shown in Fig. 9, the thrust of the trays against the carriage, as the trays swing to the mid-position indicated in dotted lines, will hold the carriage in its extreme left hand position; but as the trays are swung past such mid position to a reinverted position on the left hand half of the carriage the thrust of the trays against the carriage will force it to its extreme right hand position as shown in Fig. 10. Thus in swinging the folded trays from one to the other of the positions shown in Figs. 9 and 10, the carriage is forced to the extreme limit of its travel in the opposite direction; and, as before stated, the shifting of the carriage to either of its limits of travel brings the tray normally remote from such limit to position for registration of its light apertures with the subjacent lenses.

It will be appreciated therefore that the operations of folding, unfolding and swinging the folded trays, with accompanying shifting of the carriage, are very easily and quickly performable; so that, in the use of the apparatus, after the filler lots of eggs to be candled have been placed in the receiving tray, the operations for transferring and positioning the eggs for candling, or successively transferring and positioning them for successive candlings, require neither tiring effort nor more than a few moments of time. The handling of the trays is especially easy with the illustrative apparatus in which each tray has only two compartments at opposite sides of its longitudinal center and in which moreover the trays by their conveniently located handles 19 can be swung by two persons standing at opposite sides of the apparatus or by such persons in alternation. Practically speaking, the folding, unfolding and swinging of the folded trays with their encased contents of eggs is very light work, whether performed by one or two persons, while the shifting of the carriage is nearly or practically effortless.

To prevent the carriage under the impulse given it by the swinging of the folded trays thereon from moving to its limit of travel at such fast speed as to require sudden stoppage with a jerk or jar, means are provided presently to be described whereby the carriage as it approaches either of its limits of travel encounters a gradually increasing frictional resistance which slows down the movement of the carriage and enables it to stop gently, avoiding objectionable jerking or jarring. The means referred to also imposes a desirable frictional resistance to movement of the carriage from an extreme position.

In connection with the feature of the invention whereby the shifting of the carriage in the manner described brings it alternately to positions for registering the light apertures of the trays in alternation with the individual illuminators represented by the series of subjacent lenses, means are provided whereby the electric lamps, the circuit for which may be maintained normally open, are controllable to give illumination only when the carriage is in either of such positions, said means including limit switches actuated alternately by the carriage as it alternately reaches its respective limits of travel.

As shown in Figs. 1, 9 and 10, there are mounted at opposite ends of the intermediate portion of the cabinet a pair of switch boxes 40 containing normally open limit switches which may be of the push button type or any known or approved type suitable for the purpose. These limit switches, by the closing of either of which the normally open lamp circuit can be closed, are operable to close by depression of spring lifted plungers 41. The springs (not shown) which uphold these plungers offer substantial and in fact considerable resistance to the depressing of the plungers. Said plungers are operable by the levers 42 mounted in the path of the carriage, one on the table 2 and the other on the table 3. The levers are represented as short boards disposed on edge and arranged longitudinally of the apparatus, being pivotally mounted at 43 in brackets 44 and having their lever arms resting on and normally held up by pins 41$^a$ slidable in guides 41$^b$ in the tables and resting on the spring lifted plungers 41. The levers have stops 45 for limiting the travel of the carriage 8 and the upper edges of the levers are inclined upwardly toward said stops, said inclined upper edges of the levers being in the path of and slidably engageable by the ends of the carriage 8 as it approaches the stops 45. It will be apparent that as the carriage approaches either of its limits of travel it encounters a gradually increasing frictional resistance by slidable engagement of its advancing end with the inclined upper edge of the lever 42 in the path of its movement, by which engagement the lever is gradually depressed against the strong resistance of the spring which upholds the corresponding plunger 41. Thus the movement of the carriage is slowed down, so that it can stop gently, without objectional jerking or jarring. By the time the carriage engages the stop 45 of said lever, the plunger is depressed sufficiently to close the corresponding limit switch. Said switch is held closed so long as the plunger is held so sufficiently depressed, that is so long as the carriage remains at its said limit of travel. The pressure of said lever against the underside of the end of the carriage, due to the spring action of the plunger under the lever, imposes a desirable frictional resistance to movement of the carriage from the extreme position to which it has been moved. But as soon as the carriage is moved from such extreme position, the plunger is sufficiently released to allow the limit switch to open.

Thus the lamps are lit automatically as the carriage reaches either of its positions for holding one or the other of the trays in proper position for the candling of the eggs thereon; remain lit while the carriage stays in such a position, and become extinguished the moment the carriage moves from such a position. This gives several decided advantages. First, there is no illumination at all unless the carriage is properly positioned for holding one or the other of the two trays in proper position for candling, i. e. with its light apertures in exact registration with the individual illuminators represented by the subjacent lenses. Hence the candling of the eggs is necessarily conducted only under conditions in which the holders for the eggs are properly positioned relative to the illuminating means. Second, the illumination is a signal; presence or absence of illumination is an all sufficient indication as to whether or not the carriage is properly positioned for candling. So the operator need make no movement or adjustment of the carriage except to obtain light, which he always gets whenever the carriage is against a stop 45. If therefore the tray holding the eggs for candling is apparently in correct position, but without illumination of the eggs, the operator needs merely by a slight pressure with his hand to move the carriage against the adjacent stop 45, whereupon the eggs will become illuminated. Third, there is no confusing illumination between the periods of candling or examination of the eggs in illuminated condition, and the operators are relieved from having to look down upon illuminated light condensing and projecting lenses, which would be not only disagreeable but also hurtful to the eyes. And, lastly, unnecessary consumption of electric current is avoided.

Because of the large amount of heat generated by the plurality of large electric lamps 30 of the flood type, which are desired to give abundant high illumination, it is important that the air blowers 31 should be in operation while the lamps are lit, and desirable that the blowers should operate substantially continuously while the apparatus is in use. A simple and practical way of accomplishing this is to connect the electric lamps in a branch line from the circuit of the electric motors for operating the air blowers, or in other words to take current for the lamps from the circuit for the motors, thus insuring operation of the blowers whenever the lamps are lit, and, more specifically and advantageously, preventing the lighting of the lamps except when the blowers are in operation.

In Fig. 1 there are shown at 46 and 47 the finger pieces for actuating two snap type switches, that actuated by 46 being for opening and closing the circuit of the electrically operated blowers, and that actuated by 47 being for opening and closing the lamp circuit. As above indicated, the lamp circuit cannot be closed unless the circuit for the blowers is closed. Assuming the circuit for the blowers to be closed, the lamp circuit will ordinarily be left open by the switch actuated by 47. Under the last stated conditions, the lamp circuit will be closed alternately by the previously mentioned limit switches actuated by the carriage 8, but can be also independently manually closed and opened when desired by means of the switch actuated by 47.

At 48 in Fig. 1 there is shown the dialing knob of a dial type rheostat (63 in Fig. 11) included in the lamp circuit for regulating the intensity of the light, as is desirable to avoid illumination of the eggs by too intense light, which would render them less satisfactorily examinable than under less intense illumination, and to permit the operator to vary the light intensity to suit the particular batch of eggs being candled and to obtain the light best suited to his individual eyesight.

Figures 11, 13:
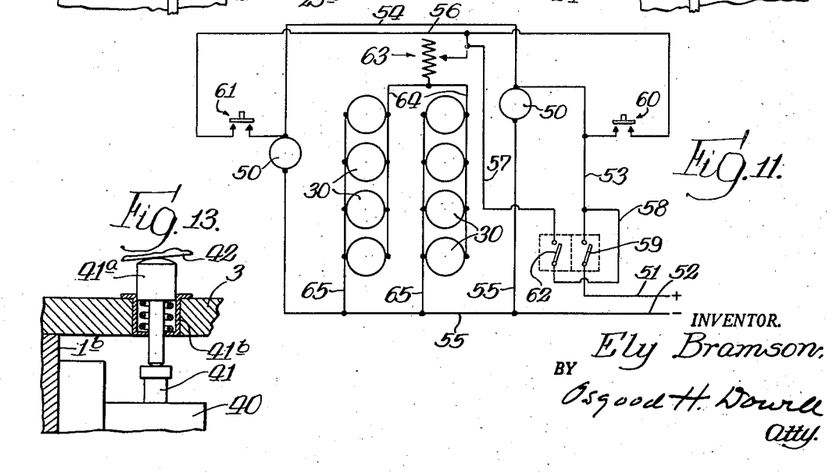
Fig. 11 is a circuit diagram for the electrical equipment of the apparatus.
Fig. 13 is a detail view of one of the limit switches shown in Figs. 9 and 10.

A wiring diagram for the electrical equipment of the illustrative apparatus is represented in Fig. 11, wherein the electric motors 50 for operating the air blowers are shown connected in parallel in a circuit controlled by the hand switch 59 (actuated by 46 in Fig. 1), and the lamps 30 are shown arranged in two banks or groups connectable in parallel across the lines of the motor circuit by either of the automatically operable limit switches 60 and 61 (being those contained in the switch boxes 40 and actuated by the carriage 8) or by the hand switch 62 (actuated by 47 in Fig. 1). The leads of the motor circuit are indicated at 51 and 52; these may be ordinary insulated circuit wires to be plug-connected to outlet terminals from any suitable energizing circuit such for instance as an ordinary house wiring circuit. Closing the hand switch 59 closes a circuit from 51 through the conductors 53 and 54, motors 50 and return conductors 55 to 52. The lamps 30 are connected to conductors 56 and 57, the conductor 56 being connectable by the limit switches 60 and 61 to the motor circuit conductors 53 and 54 respectively, and the conductor 57 being connected to one pole of the hand switch 62 the other pole of which is connected by the conductor 58 to the motor circuit conductor 53. When the motor circuit is closed, the lamp circuit can be closed by either of the limit switches 60 and 61 through the conductor 56 or by the hand switch 62 through the conductor 57. Included in circuit with the lamps is the variable resistance of the rheostat 63 (operable by the dialing knob 48 in Fig. 1) for regulation of light intensity; the adjustable terminal of said rheostat being connected to the conductors 56 and 57 and the other terminal of said rheostat being connected to the conductors 64 leading to the two banks of lamps from which the conductors 65 lead to one of the return conductors 55.

Fig. 12 of the drawings is a sectional view showing the manner of mounting or removing the removable lens holders 21.

The table tops 2 and 3 are each hinged at one longitudinal edge to one of the side walls of the cabinet stand, enabling these table tops together with the levers 42 mounted thereon to be swung up out of the way, leaving openings between the frame members 1ª and 1ᵇ for access to the light chamber.

Referring to Figs. 3 to 6, if the intermediate transverse rows of lenses 12 were covered by a removable opaque plate or light shield, so that light would be projected upwardly only through the first and last transverse rows of such lenses, then at either limit of travel of the carriage only the first and last rows of eggs on the tray carrying the eggs would be illuminated, and, inasmuch as under such conditions the row of eggs most remote from such limit would be illuminated, the other rows of eggs could be illuminated in succession by maintaining the lamps lit while moving the carriage step by step toward its opposite limit of travel. Thus with the use of such a removable light shield the apparatus could be used for candling filler lots of eggs row by row in succession, if that mode of use should be preferred. When using the apparatus in that manner, the manually operated lamp switch 62 may be kept closed.

Obviously the illustrative apparatus could be variously modified in details of construction and arrangement to suit different requirements and conditions; moreover it is not indispensable that all of the features of the invention be used conjointly, since different features may be advantageously used in various different combinations and subcombinations.

I claim as my invention:

1. An egg candling apparatus comprising, in combination, a carriage having means whereby a lot of eggs in definite spaced relation can be supported for candling alternatively at different positions on the carriage longitudinally of its direction of travel, said means including means pivotally attached to the carriage and operable for transferring said lot of eggs from one to the other of said positions and inverting the lot as it is so transferred, means supporting the carriage for movement between two extreme positions, means preventing movement of the carriage beyond said extreme positions, the distance through which the carriage is shiftable in opposite directions being sufficient to permit bringing said lot of eggs in either of the positions in which it is alternatively supported on the carriage to a certain position in the path in which the lot is movable by the carriage, and means in fixed relation to said path for illuminating the eggs when the lot is in said certain position.

2. An egg candling apparatus comprising, in combination, a carriage having means whereby a lot of eggs in definite spaced relation can be supported for candling alternatively at different positions on the carriage longitudinally of its direction of travel, said means including means pivotally attached to the carriage and operable for transferring said lot of eggs from one to the other of said positions and inverting the lot as it is so transferred, means supporting the carriage for movement between two extreme positions, means preventing movement of the carriage beyond said extreme positions, the distance through which the carriage is shiftable in opposite directions being sufficient to permit bringing said lot of eggs in either of the positions in which it is alternatively supported on the carriage to a certain position in the path in which the lot is movable by the carriage, means in fixed relation to said path for illuminating the eggs when the lot is in said certain position, and carriage-controlled means controlling said illuminating means to give illumination only when the carriage is in either of its positions for holding said lot of eggs in said certain position.

3. An egg candling apparatus comprising, in combination, a carriage having means whereby a lot of eggs in definite spaced relation can be supported for candling alternatively at different positions on the carriage longitudinally of its direction of travel, said means including means pivotally attached to the carriage and operable for transferring said lot of eggs from one to the other of said positions and inverting the lot as it is so transferred, means supporting the carriage for movement between two extreme positions, means preventing movement of the carriage beyond said extreme positions, the distance through which the carriage is shiftable in opposite directions being sufficient to permit bringing said lot of eggs in either of the positions in which it is alternatively supported on the carriage to a certain position in the path in which the lot is movable by the carriage, illuminating means in fixed relation to said path comprising electric lighting equipment for illuminating the eggs when the lot is in such certain position, the electric circuit for said lighting equipment being maintainable normally open, and automatic switch means controlled by said carriage for closing said circuit when the carriage reaches either of its positions for holding the lot of eggs in said certain position and for maintaining the circuit closed while the carriage remains in either of said last mentioned positions.

4. An egg candling apparatus comprising, in combination, a carriage having means whereby a lot of eggs in definite spaced relation can be supported for candling alternatively at different positions on the carriage longitudinally of its direction of travel, said means including means pivotally attached to the carriage and operable for transferring said lot of eggs from one to the other of said positions and inverting the lot as it is so transferred, means supporting the carriage for movement between two extreme positions, means preventing movement of the carriage beyond said extreme positions, and illuminating means arranged for illuminating the eggs when the lot is supported in a certain position thereover, said illuminating means being under and stationary relative to the path in which the lot is movable by the carriage, and said extreme positions of the carriage being in such relation to the illuminating means that upon transfer of said lot from either to the other of said positions on the carriage the lot can be brought to said certain position by the shifting of the carirage to the limit of its travel in the opposite direction to that in which the lot is so transferred.

5. An egg candling apparatus comprising, in combination, a carriage having means whereby a lot of eggs in definite spaced relation can be supported for candling alternatively at different positions on the carriage longitudinally of its direction of travel, said means including means pivotally attached to the carriage and operable for transferring said lot of eggs from one to the other of said positions and inverting the lot as it is so transferred, means supporting the carriage for movement between two extreme positions, means preventing movement of the carriage beyond said extreme positions, illuminating means in fixed relation to the path of travel of the carriage and with which the eggs when transferred from either to the other of said positions on the carriage are brought into register by the shifting of the carriage to the limit of its travel in the opposite direction to that in which the lot is so transferred, said illuminating means comprising electric lighting equipment the circuit of which is maintainable normally open, and automatic switch means controlled by the carriage for closing said circuit when the carriage reaches either of its limits of travel and maintaining the circuit closed while the carriage remains at such limit of travel.

6. An egg candling apparatus comprising, in combination, a carriage having means whereby a lot of eggs in definite spaced relation can be supported for candling alternatively at different positions on the carriage longitudinally of its direction of travel, said means including means movably attached to the carriage and operable for transferring said lot of eggs from one to the other of said positions and inverting the lot as it is so transferred, means supporting the carriage for movement between two extreme positions, means preventing movement of the carriage beyond said extreme positions, the carriage being mounted on anti-friction bearings and freely and easily movable to the opposite limits of its travel, said transferring means being so attached and movable relative to the carriage as to impose in the transferring operation a thrust on the carriage in a direction to shift it to the limit of its travel opposite that toward which the lot is transferred, and illuminating means in fixed relation to and under the path of movement of the carriage relative to which the lot is positioned for the candling of the eggs by said transferring operation and accompanying shifting of the carriage.

7. An egg candling apparatus comprising, in combination, a carriage having means whereby a lot of eggs in definite spaced relation can be supported for candling alternatively at different positions on the carriage longitudinally of its direction of travel, said means including means movably attached to the carriage and operable for transferring said lot of eggs from one to the other of said positions and inverting the lot as it is so transferred, means supporting the carriage for movement between two extreme positions, means preventing movement of the carriage beyond said extreme positions, the carriage being mounted on anti-friction bearings and freely and easily movable to the opposite limits of its travel, said transferring means being so attached and movable relative to the carriage as to impose in the transferring operation a thrust on the carriage in a direction to shift it to the limit of its travel opposite that toward which the lot is transferred, illuminating means in fixed relation to and under the path of movement of the carriage relative to which the lot is positioned for the candling of the eggs by said transferring operation and accompanying shifting of the carriage, and means for imposing a gradually increasing resistance to the movement of the carriage as it approaches either of its limits of travel, said last recited means also imposing a frictional resistance to reverse movement of the carriage from such limit of travel.

8. An egg candling apparatus comprising, in combination, a carriage having means whereby a lot of eggs in definite spaced relation can be supported for candling alternatively at different positions on the carriage longitudinally of its direction of travel, said means including means movably attached to the carriage and operable for transferring said lot of eggs from one to the other of said positions and inverting the lot as it is so transferred, means supporting the carriage for movement between two extreme positions, means preventing movement of the carriage beyond said extreme positions, the carriage being mounted on anti-friction bearings and freely and easily movable to the opposite limits of its travel, said transferring means being so attached and movable relative to the carriage as to impose in the transferring operation a thrust on the carriage in a direction to shift it to the limit of its travel opposite that toward which the lot is transferred, illuminating means in fixed relation to and under the path of movement of the carriage relative to which the lot is positioned for the candling of the eggs by said transferring operation and accompanying shifting of the carriage, said illuminating means comprising electric lighting equipment the circuit of which is maintainable normally open, means for gradually slowing the movement of the carriage as it approaches either of its limits of travel, and spring-opened switches operable by said last recited means for closing said circuit as the carriage reaches either of its limits of travel and maintaining the circuit closed while the carriage remains at such limit of travel.

9. An egg candling apparatus comprising, in combination, a reversely shiftable supporting means comprising two sets of seats for alternatively supporting a lot of eggs for candling and including means movably attached to said supporting means operable for transferring such lot from one set of seats to the other with accompanying inversion of the eggs, and a set of individual illuminators with which the respective sets of seats are registrable in alternation by shifting said supporting means in opposite directions, and means supporting and guiding said supporting means for movement relative to said set of illuminators as required for registration therewith of the respective sets of seats in alternation.

10. An egg candling apparatus comprising, in combination, a reversely shiftable supporting means comprising two sets of seats for alternatively supporting a lot of eggs for candling and including means movably attached to said supporting means operable for transferring such lot from one set of seats to the other with accompanying inversion of the eggs, a set of individual illuminators with which the respective sets of seats are registrable in alternation by shifting said supporting means in opposite directions, and means controlled by said supporting means and controlling the illuminating means to give illumination only while the supporting means is in a position for holding one or the other of said sets of seats in registration with said set of illuminators, and means supporting and guiding said supporting means for movement relative to said set of illuminators as required for registration therewith of the respective sets of seats in alternation.

11. An egg candling apparatus comprising, in combination, a carriage, a foldable pair of trays mounted on and pivotally attached to the carriage for swingability about an axis transverse of the direction of travel of the carriage, said trays being adapted for alternately supporting for candling a lot of eggs in definite spaced relation and operable for transferring said lot from one to the other by folding the vacant tray upon the one supporting the eggs and swinging the two in folded relation to a position on the carriage opposite to that from which they were swung, means for supporting the carriage for movement between two extreme positions, means preventing movement of the carriage beyond said extreme positions, the swinging of the folded trays in either direction from one to the other side of said axis causing the trays to impose a thrust on the carriage in a direction for shifting it to the limit of its travel in the opposite direction, and stationary illuminating means arranged intermediately of said extreme positions of the carriage and relative to which the trays in their respective normal positions on the carriage are alternately positioned for illumination of the eggs by the shifting of the carriage to its opposite limits of travel, the shifting of the carriage to either limit positioning the tray more remote from that limit for illumination of the eggs by said illuminating means.

12. An egg candling apparatus according to claim 1, said supporting means including a plurality of at least four sets of egg seats, said plurality being an integral multiple of four and arranged half on one side and half on the opposite side of the longitudinal center of the carriage and half on one side and half on the other side of a line transverse to the direction of travel of the carriage, those at opposite sides of said longitudinal center and at opposite sides of such transverse line being adapted for successively supporting for candling a lot or lots of eggs in definite spaced relation, said operable means being positioned relative to said sets for transferring said lot or lots from a set or sets of seats at one side of said transverse line to a set or sets of seats at the other side thereof and inverting said lot or lots as they are so transferred.

13. An egg candling apparatus according to claim 1 having a light chamber, said carriage being mounted for movement over said chamber, said illuminating means comprising a set of light condensing lenses with which the eggs in either of said positions of the lot on the carriage can be registered and lighting means within said chamber, the ceiling of the light chamber being formed in part by an opaque plate member having openings for passage of light in which said lenses are mounted, said lens holding member being removably mounted.

14. An egg candling apparatus comprising, in combination, a carriage, means supporting and guiding the carriage for movement between two extreme positions, a foldable pair of trays supported by the carriage and pivoted thereto for swingability about an axis transverse thereof, said trays being adapted for alternately supporting for candling a lot of eggs in definite spaced relation and operable for transferring said lot from one to the other by folding the empty tray upon the one supporting the eggs and swinging the two in folded relation to an inverted position, the trays being normally in unfolded relation and resting on the carriage at opposite sides of said axis and in line in the direction of travel, the carriage being shiftable in either direction between said two extreme positions, means preventing movement of the carriage beyond said extreme positions, and illuminating means relative to which the trays in alternation can be positioned to support the eggs for illumination by shifting the carriage alternately to positions in opposite relations to the illuminating means, said means being in definite relation to the path of movement of the carriage and in a medial position relative to said extreme positions of the carriage.

15. An egg candling apparatus comprising, in combination, a carriage, means supporting and guiding the carriage for movement between two extreme positions, a foldable pair of trays supported by the carriage and pivoted thereto for swingability about an axis transverse thereof, said trays being adapted for alternately supporting for candling a lot of eggs in definite spaced relation and operable for transferring said lot from one to the other by folding the empty tray upon the one supporting the eggs and swinging the two in folded relation to an inverted position, the trays being normally in unfolded relation and resting on the carriage at opposite sides of said axis and in line in the direction of travel, the carriage being shiftable in either direction between said two extreme positions, means preventing movement of the carriage beyond said extreme positions, and means for illuminating the eggs arranged under the path of the trays in a medial position relative to said extreme positions of the carriage, movement of the carriage alternately to said extreme positions disposing the trays in alternation to support the lot of eggs over the illuminating means.

16. An egg candling apparatus comprising, in combination, a carriage, means supporting and guiding the carriage for movement between two extreme positions, a foldable pair of trays supported by the carriage and pivoted thereto for swingability about an axis transverse thereof, said trays being adapted for alternately supporting for candling a lot of eggs in definite spaced relation and operable for transferring said lot from one to the other by folding the empty tray upon the one supporting the eggs and swinging the two in folded relation to an inverted position, the trays being normally in unfolded relation and resting on the carriage at opposite sides of said axis and in line in the direction of travel, the carriage being shiftable in either direction between said two extreme positions, means preventing movement of the carriage beyond said extreme positions, means for illuminating the eggs arranged under the path of the trays in a medial position relative to said extreme positions of the carriage, movement of the carriage alternately to said extreme positions disposing the trays in alternation to support the lot of eggs over the illuminating means, and carriage-controlled means controlling the illuminating means to give illumination only when the carriage is in either of said extreme positions.

17. An egg candling apparatus comprising, in combination, a carriage, means supporting and guiding the carriage for movement between two extreme positions, a foldable pair of trays supported by the carriage and pivoted thereto for swingability about an axis transverse thereof, said trays being adapted for alternately supporting for candling a lot of eggs in definite spaced relation and operable for transferring said lot from one to the other by folding the empty tray upon the one supporting the eggs and swinging the two in folded relation to an inverted position, the trays being normally in unfolded relation and resting on the carriage at opposite sides of said axis and in line in the direction of travel, the carriage being shiftable in either direction between said two extreme positions, means preventing movement of the carriage beyond said extreme positions, movement of the carriage alternately to said extreme positions disposing the trays in alternation to support said lot in a certain position in the path of the trays, and means in stationary relation to said path for illuminating the eggs when the lot is supported in said certain position by either tray.

18. An egg candling apparatus comprising, in combination, a carriage, means supporting and guiding the carriage for movement between two extreme positions, a foldable pair of trays supported by the carriage and pivoted thereto for swingability about an axis transverse thereof, said trays being adapted for alternately supporting for candling a lot of eggs in definite spaced relation and operable for transferring said lot from one to the other by folding the empty tray upon the one supporting the eggs and swinging the two in folded relation to an inverted position, the trays being normally in unfolded relation and resting on the carriage at opposite sides of said axis and in line in the direction of travel, the carriage being shiftable in either direction between said two extreme positions, means preventing movement of the carriage beyond said extreme positions, movement of the carriage alternately to said extreme positions disposing the trays in alternation to support said lot in a certain position in the path of the trays, means in stationary relation to said path for illuminating the eggs when the lot is supported in said certain position by either tray, and carriage-controlled means controlling said illuminating means to give illumination only when the carriage is in either of said extreme positions.

19. An egg candling apparatus comprising, in combination, a carriage, means supporting and guiding the carriage for movement between two extreme positions, a foldable pair of trays supported by the carriage and pivoted thereto for swingability about an axis transverse thereof, said trays being adapted for alternately supporting for candling a lot of eggs in definite spaced relation and operable for transferring said lot from one to the other by folding the empty tray upon the one supporting the eggs and swinging the two in folded relation to an inverted position, the trays being normally in unfolded relation and resting on the carriage at opposite sides of said axis and in line in the direction of travel, the carriage being shiftable in either direction between said two extreme positions, means preventing movement of the carriage beyond said extreme positions, the distance through which the carriage is shiftable in opposite directions being sufficient to permit disposing the trays in alternation to support said lot in a certain position in the path of the trays, and means in stationary relation to said path for illuminating the eggs when the lot is supported in said certain position by either tray.

20. An egg candling apparatus comprising, in combination, a carriage, means supporting and guiding the carriage for movement between two extreme positions, a foldable pair of trays supported by the carriage and pivoted thereto for swingability about an axis transverse thereof, said trays being adapted for alternately supporting for candling a lot of eggs in definite spaced relation and operable for transferring said lot from one to the other by folding the empty tray upon the one supporting the eggs and swinging the two in folded relation to an inverted position, the trays being normally in unfolded relation and resting on the carriage at opposite sides of said axis and in line in the direction of travel, the carriage being shiftable in either direction between said two extreme positions, means preventing movement of the carriage beyond said extreme positions, the distance through which the carriage is shiftable in opposite directions being sufficient to permit disposing the trays in alternation to support said lot in a certain position in the path of the trays, means in stationary relation to said path for illuminating the eggs when the lot is supported in said certain position by either tray, and carriage-controlled means controlling the illuminating means to give illumination only when the carriage is in either of its positions for supporting said lot in said certain position.

21. An egg candling apparatus comprising, in combination, a carriage, means supporting and guiding the carriage for reciprocation in a horizontally disposed path, a foldable pair of trays supported by the carriage and pivoted thereto for swingability about an axis transverse thereof, said trays being adapted for alternately supporting for candling a lot of eggs in definite spaced relation and operable for transferring said lot from one to the other by folding the empty tray upon the one supporting the eggs and swinging the two in folded relation to an inverted position, the trays being normally in unfolded relation and resting on the carriage at opposite sides of said axis and in line in the direction of travel, and means for illuminating the eggs arranged under the path of the trays over which said lot of eggs can be supported by either tray, the trays in alternation being disposable to support said lot over the illuminating means by shifting the carriage alternately to positions in opposite relations to the illuminating means.

22. An egg candling apparatus comprising, in combination, a carriage, means supporting and guiding the carriage for reciprocation in a horizontally disposed path, a foldable pair of trays supported by the carriage and pivoted thereto for swingability about an axis transverse thereof, said trays being adapted for alternately supporting for candling a lot of eggs in definite spaced relation and operable for transferring said lot from one to the other by folding the empty tray upon the one supporting the eggs and swinging the two in folded relation to an inverted position, the trays being normally in unfolded relation and resting on the carriage at opposite sides of said axis and in line in the direction of travel, means for illuminating the eggs arranged under the path of the trays over which said lot of eggs can be supported by either tray, the trays in alternation being disposable to support said lot over the illuminating means by shifting the carriage alternately to positions in opposite relations to the illuminating means, and carriage-controlled means controlling said illuminating means to give illumination only when the carriage is in either of its positions to support said lot over the illuminating means.

23. An egg candling apparatus comprising, in combination, a carriage, means supporting and guiding the carriage for reciprocation in a horizontally disposed path, a foldable pair of trays supported by the carriage and pivoted thereto for swingability about an axis transverse thereof, said trays being adapted for alternately supporting for candling a lot of eggs in definite spaced relation and operable for transferring said lot from one to the other by folding the empty tray upon the one supporting the eggs and swinging the two in folded relation to an inverted position, the trays being normally in unfolded relation and resting on the carriage at opposite sides of said axis and in line in the direction of travel, and means in stationary relation to the path of the trays for illuminating the eggs when the lot is supported in a certain position in said path, the trays in alternation being disposable to support said lot in said certain position by shifting the carriage alternately to certain positions in opposite relations to the illuminating means.

24. An egg candling apparatus comprising, in combination, a carriage, means supporting and guiding the carriage for reciprocation in a horizontally disposed path, a foldable pair of trays supported by the carriage and pivoted thereto for swingability about an axis transverse thereof, said trays being adapted for alternately supporting for candling a lot of eggs in definite spaced relation and operable for transferring said lot from one to the other by folding the empty tray upon the one supporting the eggs and swinging the two in folded relation to an inverted position, the trays being normally in unfolded relation and resting on the carriage at opposite sides of said axis and in line in the direction of travel, means in stationary relation to the path of the trays for illuminating the eggs when the lot is supported in a certain position in said path, the trays in alternation being disposable to support said lot in said certain position by shifting the carriage alternately to certain positions in opposite relations to the illuminating means, and carriage-controlled means controlling the illuminating means to give illumination only when the carriage is in either of its said positions.

ELY BRAMSON.